United States Patent
King et al.

(10) Patent No.: US 9,950,318 B2
(45) Date of Patent: Apr. 24, 2018

(54) METAL OXIDE CATALYSTS WITH A LASER INDUCED HYDROPHOBIC CHARACTERISTIC

(71) Applicant: International Business Machines Corporation, Armonk, NY (US)

(72) Inventors: Scott B. King, Rochester, MN (US); Brandon M. Kobilka, Tucson, AZ (US); Joseph Kuczynski, North Port, FL (US); Jason T. Wertz, Pleasant Valley, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/148,247

(22) Filed: May 6, 2016

(65) Prior Publication Data

US 2017/0320050 A1    Nov. 9, 2017

(51) Int. Cl.
*B01J 35/10* (2006.01)
*B01J 23/00* (2006.01)
*B01J 37/34* (2006.01)
*B01J 23/75* (2006.01)

(52) U.S. Cl.
CPC ............. *B01J 37/349* (2013.01); *B01J 23/75* (2013.01); *B01J 35/10* (2013.01)

(58) Field of Classification Search
CPC ........... B01J 37/349; B01J 35/10; B01J 23/00
See application file for complete search history.

(56) References Cited

U.S. PATENT DOCUMENTS

| | | | |
|---|---|---|---|
| 4,812,464 A | 3/1989 | Farooq et al. | |
| 5,427,993 A * | 6/1995 | Perry | B01J 37/0238 204/157.41 |
| 5,478,952 A | 12/1995 | Schwartz | |
| 6,419,998 B1 * | 7/2002 | McGrath | B01J 23/50 427/523 |
| 6,869,712 B2 | 3/2005 | Mittelstadt et al. | |
| 7,776,782 B2 | 8/2010 | Werpy et al. | |
| 7,879,128 B2 * | 2/2011 | El-Shall | A24B 15/28 422/186 |
| 8,007,758 B2 * | 8/2011 | Stark | B01J 23/002 423/592.1 |
| 8,020,567 B2 * | 9/2011 | El-Shall | A24B 15/28 131/334 |
| 8,685,185 B2 | 4/2014 | Guo et al. | |
| 9,079,164 B2 | 7/2015 | Woodfield et al. | |
| 9,421,523 B2 * | 8/2016 | Naeemi | B01J 23/75 |
| 2004/0140296 A1 | 7/2004 | Lis | |

(Continued)

OTHER PUBLICATIONS

Vorobyev et al., "Multifunctional Surfaces Produced by Femtosecond Laser Pulses", Journal of Applied Physics 117, 2015, 6 pages.

(Continued)

*Primary Examiner* — Cam N. Nguyen
(74) *Attorney, Agent, or Firm* — Patterson + Sheridan, LLP

(57) ABSTRACT

A process for treating metal oxide catalysts includes activating one or more lasers to produce laser light. The process also includes exposing at least a portion of the metal oxide catalyst to the laser light to increase hydrophobicity of the metal oxide catalyst. The metal oxide catalyst may include a plurality of metal oxide particles or a metal oxide film.

19 Claims, 4 Drawing Sheets

(56) References Cited

U.S. PATENT DOCUMENTS

2012/0328905 A1 12/2012 Guo et al.
2014/0154526 A1 6/2014 Guo et al.
2015/0136226 A1 5/2015 Guo et al.

OTHER PUBLICATIONS

Zhao, et al., "Performance of an Novel Hydrophobic Mesoporous Material for High Temperature Catalytic Oxidation of Naphthalene", Hindawi Publishing Corp., Journal of Spectroscopy, vol. 2014, 7 pp.
Chen, et al., "Hydrophobic Polymer-Coated Metal Oxide Catalysts for Effective Low-Temperature Oxidation of CO Under Moisture-rich Conditions", Chem. Mater., 2010, vol. 22, pp. 3313-3315.

* cited by examiner

METAL OXIDE CATALYSTS WITH A LASER INDUCED HYDROPHOBIC CHARACTERISTIC

I. FIELD OF THE DISCLOSURE

The present disclosure relates generally to metal oxide catalysts with a laser induced hydrophobic characteristic.

II. BACKGROUND

Metal oxide catalysts may be used in a wide variety of chemical reactions including, but not limited to, elimination of carbon monoxide, decomposition of organic contaminants, bio-based production (e.g., biodiesel production), or combinations thereof. A feed stream, reaction products, or both, may include water. Water may deactivate a metal oxide catalyst, solubilize the metal oxide catalyst, or both. Activation of deactivated catalyst, separation of catalyst from reaction products, or both, may be costly and time intensive.

III. SUMMARY OF THE DISCLOSURE

According to an embodiment, a process for treating metal oxide catalysts is disclosed. The process includes activating one or more lasers to produce laser light. The method also includes exposing at least a portion of the metal oxide catalyst to the laser light to increase hydrophobicity of the metal oxide catalyst.

According to another embodiment, an article of manufacture is disclosed. The article of manufacture includes a metal oxide catalyst with at least one textured surface. The at least one textured surface is textured by exposure to laser light to increase hydrophobicity of the metal oxide catalyst.

According to another embodiment, a catalyst produced by a process is disclosed. The catalyst is produced by activating one or more lasers to produce laser light, and exposing at least a portion of a metal oxide to the laser light to increase hydrophobicity of the metal oxide.

Features and benefits that characterize embodiments are set forth in the claims annexed hereto and forming a further part hereof. However, for a better understanding of the embodiments, and of the advantages and objectives attained through their use, reference should be made to the Drawings and to the accompanying descriptive matter.

IV. BRIEF DESCRIPTION OF THE DRAWINGS

V. DETAILED DESCRIPTION

The present disclosure describes a metal oxide catalyst with laser induced hydrophobic characteristics. In some circumstances, a metal oxide catalyst may be used due to its catalytic activity for a desired reaction. However, when reactants, reaction products, or reaction byproducts include water, the metal oxide catalyst can be deactivated due to contact with the water. Accordingly, limiting or eliminating water contact with the metal oxide catalyst may improve production associated with the reaction (e.g., by limiting or eliminating catalyst servicing steps, such as catalyst reactivation or replacement).

A metal oxide catalyst base material may be formed by any method of choice, such as by oxidation of a metal substrate, by powder sintering, by deposition of a film on a substrate, by other methods, or by combinations thereof. In some implementations, the metal oxide base material may include or may be processed to form particles that are treated to increase hydrophobicity. For example, the particles may be exposed to flashes of light from a femtosecond pulse laser to texture the metal oxide catalyst. Texturing the metal oxide catalyst may increase hydrophobicity of the metal oxide catalyst as compared to the metal oxide catalyst before exposure to the laser light. For example, the texturing may form features on the metal oxide catalyst that are sized to limit wetting of the surface of the metal oxide catalyst due to a contact angle associated with multi-phase contact between water, the metal oxide catalyst, and one or more reactants or reaction products. The texturing may induce various contact angles with water and may induce various degrees of hydrophobicity (e.g., superhydrophobicity). After surface treatment by exposure to the laser light, the metal oxide catalyst with the laser induced hydrophobic characteristic may be placed in a reaction vessel and may be used to catalyze the desired reaction.

Figure 1:
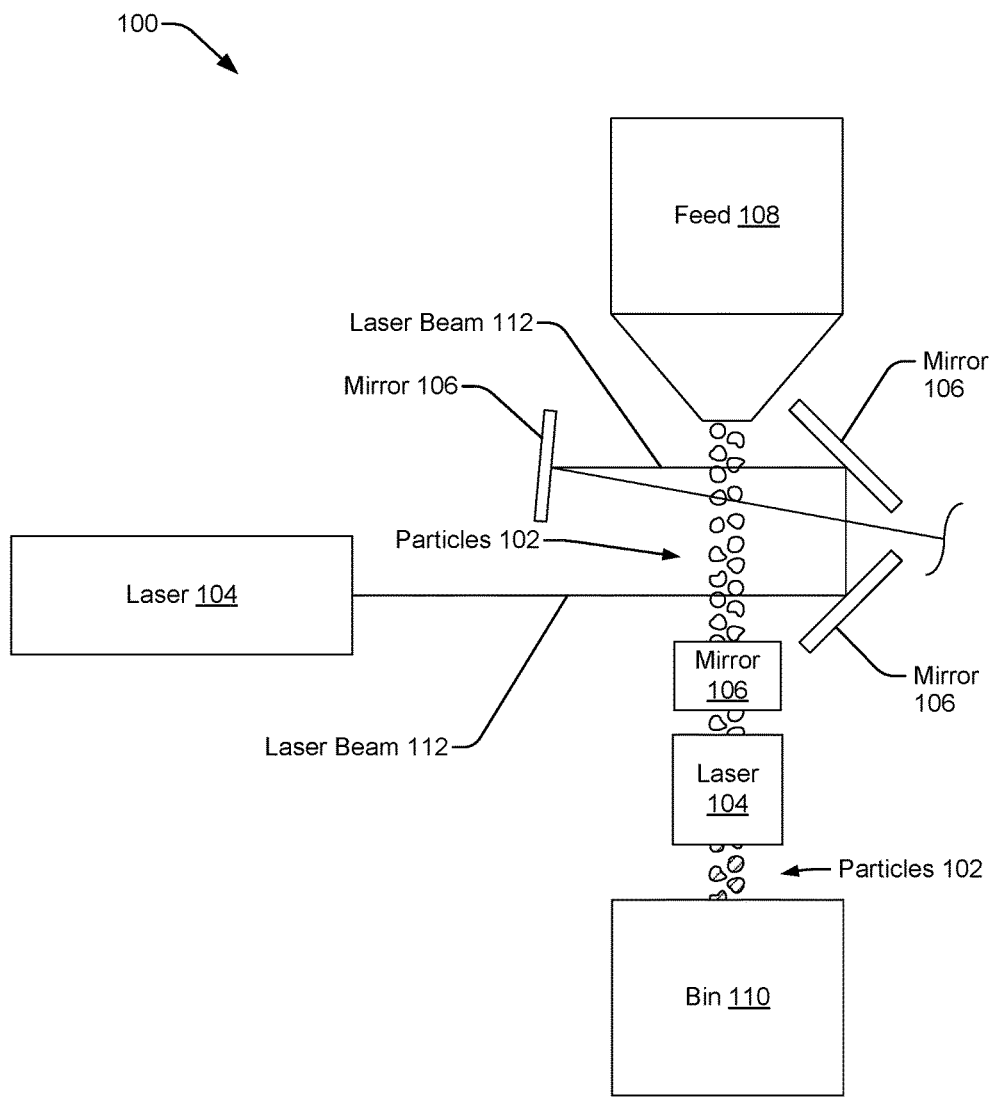
FIG. 1 is a block diagram illustrating a system for forming metal oxide catalyst with a laser induced hydrophobic characteristic, according to one embodiment.

Referring to FIG. 1, a block diagram illustrates a particular embodiment of a system 100 for forming metal oxide catalyst with a laser induced hydrophobic characteristic. In FIG. 1, the system 100 includes particles 102 of metal oxide catalyst, one or more lasers 104, one or more mirrors 106, a feed 108, and a bin 110.

The one or more lasers 104 may be activated to generate one or more laser beams 112. The one or more mirrors 106 may be arranged to reflect the one or more laser beams 112 such that the one or more laser beams 112 have multiple points of intersection with a travel path of the particles 102 as the particles 102 pass from the feed 108 to the bin 110. A plurality of lasers 104, a plurality of mirrors 106, or both, may enable exposure of the particles 102 to laser beams from multiple directions so that a large percentage of a surface area of each of the particles 102 is textured to increase hydrophobicity of the particles 102 of metal oxide catalyst.

In FIG. 1, the particles 102 are gravity fed from the feed 108 to the bin 110. In another embodiment, the particles 102 may be aerosolized and sprayed from the feed 108 to the bin 110, or caused to move across the laser beams 112 via another feed mechanism. As the particles 102 pass from the feed 108 to the bin 110, the particles 102 may be exposed to one or more of the laser beams 112 that pass through the travel path of the particles 102. The particles 102 exposed to the laser beams 112 may be textured by the laser beams to increase hydrophobicity of the particles 102. For example, when a laser beam 112 intersects a particular particle, a portion of a surface of the particular particle may be vaporized or ablated, leaving behind a textured surface. In this example, features formed on the surface of the particular particle may be too small to be wetted by water based on a contact angle of water with the metal oxide catalyst.

In some embodiments, the particles 102, or a portion of the particles 102, from the bin 110 may be returned to the feed 108 to enable additional exposure of the particles 102 to the laser beams 112 for additional texturing. In other embodiments, one pass of the particles 102 from the feed 108 to the bin 110 is sufficient to treat the particles 102. Particles 102 in the bin 110 that are not to be returned to the feed 108 may be coupled to a secondary structure, may be placed in a reaction vessel, or both.

Thus, FIG. 1 illustrates an example of a system 100 to form particles 102 of metal oxide catalyst with a laser induced hydrophobic characteristic. The particles 102 may be gravity fed, or sprayed through, one or more laser beams 112 to texture surfaces of the particles 102 to increase hydrophobicity of the particles 102 relative to particles 102 not exposed to the one or more laser beams 112.

Figure 2:
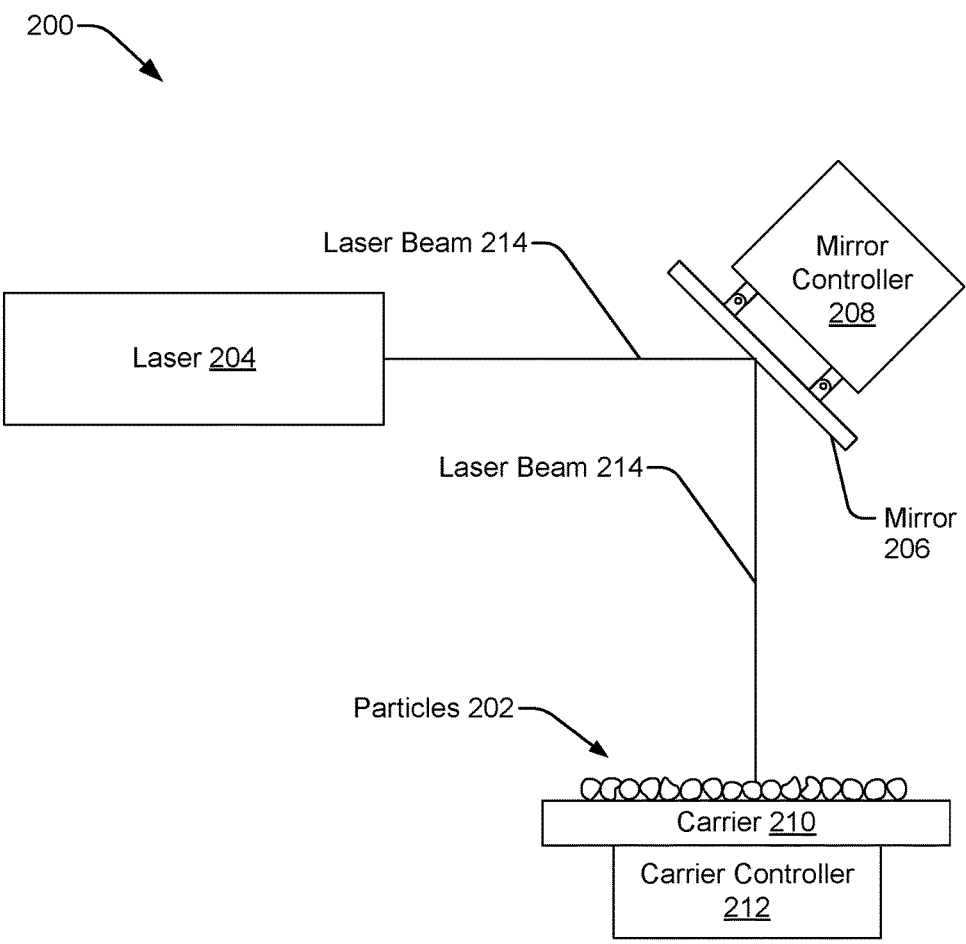
FIG. 2 is a block diagram illustrating a system for forming metal oxide catalyst with a laser induced hydrophobic characteristic, according to one embodiment.

Referring to FIG. 2, a block diagram illustrates a particular embodiment of a system 200 for forming metal oxide catalyst with laser induced hydrophobic characteristics. In FIG. 2, the system 200 includes particles 202 of metal oxide catalyst, one or more lasers 204, one or more mirrors 206, one or more mirror controllers 208, a carrier 210, and a carrier controller 212.

The particles 202 may be placed on the carrier 210. The carrier 210 may be stationary or movable relative to the mirror 206. For example, the carrier 210 may include or correspond to a conveyor belt, a tray, or another container. In some implementations, the carrier 210 may be movable by the carrier controller 212 so that one or more laser beams 214 generated by the one or more lasers 204 are rastered (i.e., moved) across the particles 202 on the carrier 210 to expose the particles 202 to the one or more laser beams 214. The carrier controller 212 may also, or as an alternative, be configured to vibrate in order to change an orientation of the particles 202 relative to the one or more laser beams 214 so that a large percentage of the surface areas of the particles 202 are textured to increase the hydrophobicity of the particles relative to particles 202 that are not exposed to the one or more laser beams 214.

In an embodiment, the carrier controller 212 may be used to move the carrier 210 in multiple directions, in which case the one or more mirror controllers 208 may be omitted. In other embodiments, the carrier controller 212 may be used to linearly move the carrier 210 (e.g., in a direction into the plane of the page, out of the plane of the page, or both) and the one or more mirror controllers 208 may be used to move the one or more laser beams in other directions (e.g., across a direction of travel of the particles 202) so that a large percentage of the particles 202 on the carrier 210 are exposed to the one or more laser beams 214.

The one or more mirrors 206 may direct the one or more laser beams 214 to the particles 202 on the carrier 210. The one or more mirror controllers 208 may change positions of the one or more mirrors 206 relative to the particles 202 so that the one or more laser beams 214 are rastered across the particles 202 on the carrier 210 to expose the particles 202 to the one or more laser beams 214.

In an embodiment, a laser beam from a particular laser of the one or more lasers 204 may be directly aimed at the particles 202. A movement controller coupled to the particular laser, the carrier controller 212, or both, may be used to raster the laser beam across the particles 202. The particles 202 on the carrier 210 may be passed through the one or more laser beams 214 one or more times to texture the surfaces of the particles 202 to increase hydrophobicity of the particles 202 relative to particles 202 not exposed to the one or more laser beams 214. For example, when the laser beam 214 intersects a particular particle, a portion of a surface of the particular particle may be vaporized or ablated, leaving behind a textured surface with increased hydrophobicity. In this example, features formed on the surface of the particular particle may be too small to be wetted by water based on a contact angle of water with the metal oxide catalyst. After a last pass of the particles 202 through the one or more laser beams 214, the particles 202 may be coupled to a secondary structure, may be placed in a reaction vessel, or both.

Thus, FIG. 2 illustrates an example of a system 200 to form particles 202 of metal oxide catalyst with a laser induced hydrophobic characteristic. The particles 202 may be placed on a carrier 210 and exposed to one or more laser beams 214. The carrier 210 may vibrate the particles to change portions of the surfaces of the particles 202 exposed to the one or more laser beams, may linearly move the carrier 210 in one or more directions, or both. The one or more laser beams 214 may be rastered across the particles 202 (e.g., by movement of the carrier 210, by movement of one or more mirrors 206 by one or more mirror controllers 208, or both) to expose the particles 202 to laser light. Exposure of the particles 202 to the laser light may texture surfaces of the particles 202 to increase hydrophobicity of the particles 202 relative to particles 202 not exposed to the laser light.

Figure 3:
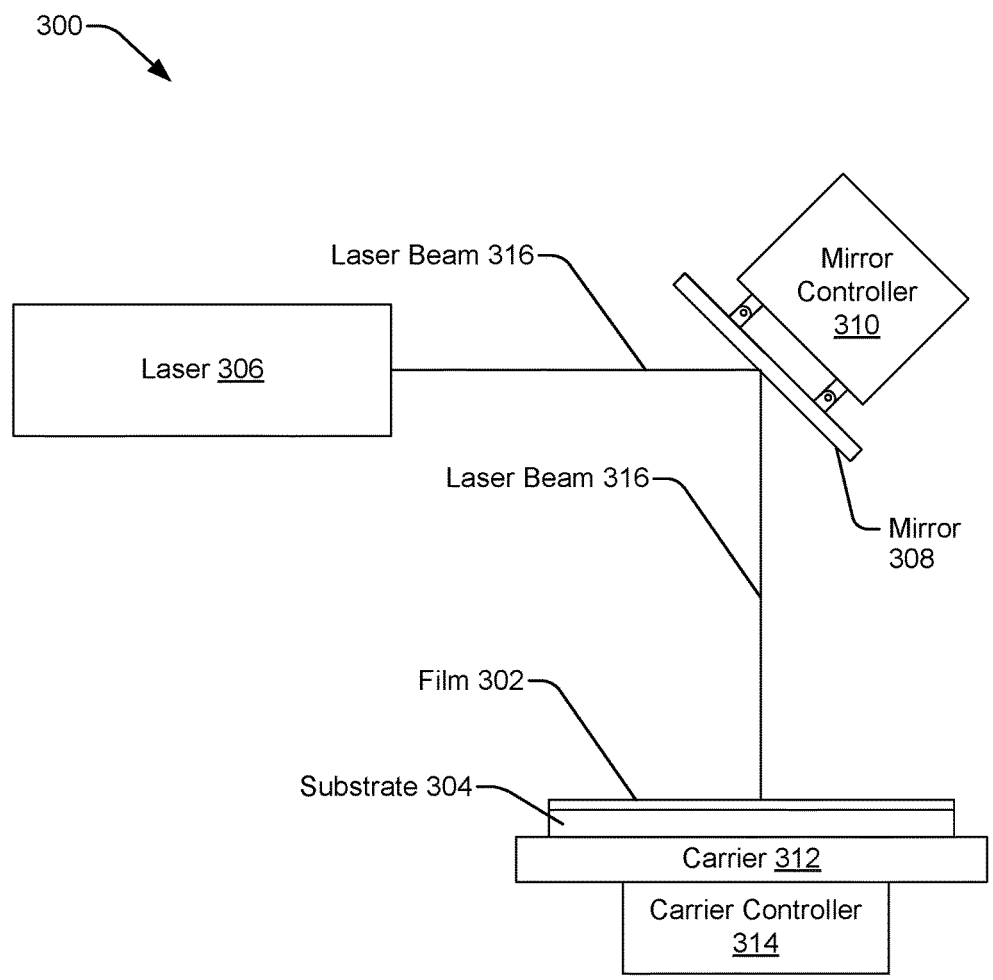
FIG. 3 is a block diagram illustrating a system for forming metal oxide catalyst with a laser inducted hydrophobic characteristic, according to one embodiment.

Referring to FIG. 3, a block diagram illustrates a particular embodiment of a system 300 for forming metal oxide catalyst with a laser induced hydrophobic characteristic. In FIG. 3, the system 300 includes a film 302 of metal oxide catalyst coupled to a substrate 304, one or more lasers 306, one or more mirrors 308, one and one more mirror controllers 310, a carrier 312, and carrier controller 314. The film 302 may be formed on the substrate 304 (e.g., using a vapor deposition process or a process to oxidize a layer of the substrate 304), adhered to the substrate 304, attached to the substrate 304 by another process, or combinations thereof.

The combination of the film 302 and the substrate 304 may be placed on the carrier 312. The carrier 312 may be movable by the carrier controller 314 so that one or more laser beams 316 generated by the one or more lasers 306 are rastered across the film 302 to texture the surface of the film 302. In FIG. 3, the one or more laser beams 316 may be used to apply a predetermined pattern to the surface of the film 302. For example, the pattern may be selected to provide desired hydrophobic characteristics and to increase available surface reaction sites, which may increase catalytic activity of the metal oxide catalyst.

In an embodiment, the carrier controller 314 may be used to move the carrier 312 in one or more directions (e.g., linearly or about an axis). In this embodiment, the one or more mirror controllers 310 may be omitted. In other embodiments, the carrier controller 314 may be used to move the carrier 312 in a first direction, and the one or more mirror controllers 310 may be used to move the one or more laser beams 316 in another direction so that a large percentage of the film 302 is exposed to the one or more laser beams 316. Movement of the carrier 312 and the one or more laser beams 316 may be concurrent or sequential.

The one or more mirrors 308 may direct the one or more laser beams 316 to the film 302 on the carrier 312. The one or more mirror controllers 310 may change positions of the one or more mirrors 308 relative to the film 302 so that the one or more laser beams 316 are rastered across the film 302 on the carrier 312 to expose the film 302 to the one or more laser beams 316.

In an embodiment, a laser beam from a particular laser of the one or more lasers 306 may be directly aimed at the film 302. A movement controller coupled to the particular laser, the carrier controller 314, or both, may be used to raster the laser beam across the film 302. The film may be passed through the one or more laser beams 316 one or more times to texture the surface of the film 302 to increase hydrophobicity of the film 302 relative to a film of the metal oxide catalyst not exposed to the one or more laser beams 316. For example, when a laser beam of the one or more laser beams 316 intersects the film 302, a portion of a surface of the film 302 may be vaporized or ablated, leaving behind a textured surface with increased hydrophobicity. In this example, features formed on the surface of the film 302 may be too small to be wetted by water based on a contact angle of water with the metal oxide catalyst. After a last pass of the film 302 through the one or more laser beams 316, the combination of the film 302 and substrate may be placed in a reaction vessel. Alternately, the film 302 or the film 302 with the substrate 304 may be further processed, e.g., shaped to generate a metal oxide catalyst having a desired shape, such as a saddle shape.

Thus, FIG. 3 illustrates an example of a system 300 to form a film 302 of metal oxide catalyst with a laser induced hydrophobic characteristic. The film 302 may be placed on a carrier 312 and exposed to one or more laser beams 316. The one or more laser beams 316 may be rastered across the film 302 (e.g., by movement of the carrier 312, by movement of one or more mirrors 308, or both) to expose the film 302 to laser light. Exposure of the film 302 to the laser light may texture a surface of the film 302 to increase hydrophobicity of the film 302 relative to a film of the metal oxide catalyst not exposed to the laser light.

Figure 4:
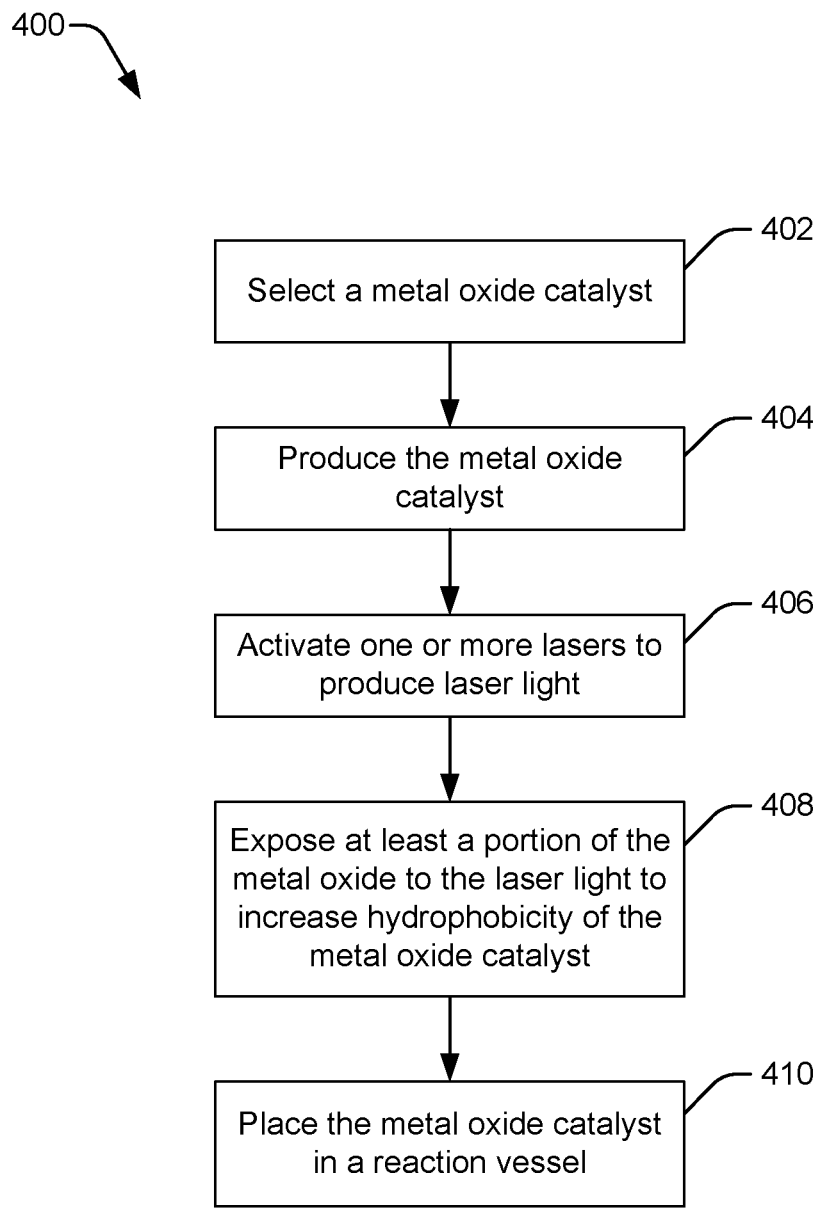
FIG. 4 is a flow diagram showing a particular embodiment of a process of forming a metal oxide catalyst with a laser induced hydrophobic characteristic of the present disclosure.

Referring to FIG. 4, a flow diagram illustrates an example of a process 400 of forming a metal oxide catalyst with a laser induced hydrophobic characteristic of the present disclosure. In particular embodiments, the process 400 may use one of the systems 100-300 depicted in FIGS. 1-3.

Process 400 may include selecting a metal oxide catalyst, at 402. The metal oxide catalyst may be selected based on catalytic activity for a desired reaction. As a particular, non-limiting example, if the reaction includes oxidation of carbon monoxide to form carbon dioxide, a cobalt oxide (e.g., $Co_3O_4$) may be used. The metal oxide catalyst may be produced, at 404. The metal oxide catalyst may be produced, for example, by oxidation of a metal substrate, by powder sintering, using a vapor deposition process, using other processes, or combinations thereof.

One or more lasers may be activated to produce laser light, at 406. The one or more lasers may include one or more femtosecond pulse lasers. In an embodiment, the one or more lasers may produce laser light having about 65 femtosecond (fs) pulses of light at a wavelength of about 800 nanometers (nm), a rate of approximately 1 kilohertz (kHz), and an energy of about 4 to 10 joules per square centimeter ($J/cm^2$). In other embodiments, laser light with the other characteristics may be used.

At least a portion of the metal oxide catalyst may be exposed to the laser light to increase hydrophobicity of the metal oxide catalyst, at 408. Exposing the metal oxide to the laser light may microscopically texture the metal oxide to induce steric hydrophobicity. Inducing steric hydrophobicity may improve aqueous catalytic behavior and may improve catalytic behavior in organic solvents that contain small amounts of water (e.g., organic solvents that are not dry or dried).

In a first embodiment, the metal oxide catalyst may include or correspond to particles. The particles may be aerosolized and sprayed, or gravity fed, through the laser light. The particles may be passed through the laser light several times to ensure that a large percentage of surface areas of the particles are textured by the laser light. Alternatively, the particles may be placed on a carrier. The laser light may be rastered across the particles on the carrier using a mirror, movement of the lasers, movement of the carrier, or combinations thereof. The carrier may be vibrated to change surface portions of the particles exposed to the laser light and to ensure that a large percentage of surface areas of the particles are textured by the laser light.

In a second embodiment, the metal oxide catalyst may include or correspond to a film deposited on a substrate. The film and the substrate may be placed on a carrier. The laser light may be rastered across the film on the carrier using a mirror, movement of the carrier, movement of the laser, or combinations thereof.

After the surface is textured, the metal oxide catalyst may be placed in a reaction vessel, at 410. For example, when the metal oxide catalyst includes particles, the particles may be placed in a reaction chamber as a packed bed. Alternately, the particles may be deposited on one or more secondary structures. For example, the particles may be coupled to activated carbon scaffolds. The one or more secondary structures may be placed in a reaction vessel. As another example, when the metal oxide catalyst includes a film and substrate combination, one or more of the film and substrate combinations may be attached to one or more supports in a reaction vessel.

After the metal oxide catalyst is placed in the reaction vessel, the reaction vessel may be brought to reaction conditions. One or more reactants may be exposed to the catalyst and reacted to form reaction products.

Thus, FIG. 4 illustrates an example of a process of forming a metal oxide catalyst with laser induced hydrophobic characteristics. The metal oxide catalyst may include particles or a film coupled to a substrate. The metal oxide catalyst may be exposed to laser light to texture the metal oxide catalyst. Texturing the metal oxide catalyst by exposure to the laser light may increase the hydrophobicity of the metal oxide catalyst as compared to the same metal oxide catalyst that is not exposed to the laser light. Subsequently, the metal oxide catalyst may be placed in a reaction vessel, the reaction vessel may be brought to reaction conditions, reactants may be introduced to the reaction vessel, and the metal oxide catalyst may be used to produce reaction products.

Various embodiments disclosed herein describe a metal oxide catalyst with a laser induced hydrophobic characteristic. A metal oxide catalyst may be exposed to laser light from a femtosecond pulse laser to induce the hydrophobic characteristic. Exposing the metal oxide catalyst to the laser light may texture the surface of the metal oxide catalyst (e.g., by ablation or vaporization). The texturing may increase surface area of the metal oxide catalyst, increase hydrophobicity of the metal oxide catalyst as compared to the same metal oxide catalyst that is not exposed to the laser light, or both. The metal oxide catalyst with the laser induced hydrophobicity may be used to catalyze a reaction. The metal oxide catalyst with the laser induced hydrophobicity may advantageously provide a greater conversion of reactants to reaction products, may have a longer life before deactivation, or both.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

The invention claimed is:

1. A process for treating metal oxide catalysts, the process comprising:
   activating one or more lasers to produce laser light;
   exposing at least a portion of the metal oxide catalyst to the laser light to increase the hydrophobicity of the metal oxide catalyst by forming features that are too small to be wetted by water based on a contact angle of water with the metal oxide catalyst, wherein exposing at least a portion of the metal oxide catalyst comprises one or more of (a)-(c):
   (a) gravity feeding the metal oxide catalyst through the laser light one or more times;
   (b) placing the metal oxide catalyst on a carrier and passing the metal oxide catalyst on the carrier at least one time through one or more beams produced by the one or more lasers; or
   (c) aerosolizing the metal oxide catalyst and spraying the metal oxide catalyst through the laser light one or more times; and
   placing the metal oxide catalyst in a reaction vessel.

2. The process of claim 1, wherein the metal oxide catalyst comprises a plurality of particles.

3. The process of claim 2, further comprising vibrating the carrier to change positions of the particles on the carrier so that the laser light contacts multiple portions of the particles.

4. The process of claim 2, further comprising depositing the particles on a secondary structure.

5. The process of claim 1, wherein the metal oxide catalyst comprises a film coupled to a substrate.

6. The process of claim 1, wherein the one or more lasers include a femtosecond pulse laser.

7. The process of claim 6, wherein the one or more lasers produce laser light having about 65 femtosecond (fs) pulses of light at a wavelength of about 800 nanometers (nm), a rate of approximately 1 kilohertz (kHz), and an energy of about 4 to 10 joules per square centimeter ($J/cm^2$).

8. The process of claim 1, further comprising depositing the particles on a secondary structure.

9. The process of claim 1, wherein the metal oxide catalyst comprises a film coupled to a substrate.

10. The process of claim 1, wherein the one or more lasers include a femtosecond pulse laser.

11. The process of claim 10, wherein the one or more lasers produce laser light having about 65 femtosecond (fs) pulses of light at a wavelength of about 800 nanometers (nm), a rate of approximately 1 kilohertz (kHz), and an energy of about 4 to 10 joules per square centimeter ($J/cm^2$).

12. The process of claim 1, further comprising rastering the one or more lasers across the metal oxide catalyst.

13. The process of claim 12, wherein the rastering the one or more lasers across the metal oxide catalyst comprises using one or more mirrors, movement of the one or more lasers, movement of the metal oxide catalyst, or a combination thereof.

14. The process of claim 1, wherein the metal oxide catalyst is formed by oxidation of a metal substrate, powder sintering, vapor deposition, or combinations thereof.

15. A process for treating metal oxide catalysts, the process comprising:
   activating one or more lasers to produce laser light; and
   exposing at least a portion of the metal oxide catalyst to the laser light to increase the hydrophobicity of the metal oxide catalyst by forming features that are too small to be wetted by water based on a contact angle of water with the metal oxide catalyst, wherein the metal oxide catalyst comprises a plurality of particles, and wherein exposing the metal oxide catalyst to the laser light comprises one or more of (a)-(c):
   (a) gravity feeding the particles through the laser light one or more times;
   (b) placing the particles on a carrier and passing the particles on the carrier at least one time through one or more beams produced by the one or more lasers; or
   (c) aerosolizing the particles and spraying the particles through the laser light one or more times; and
   placing the particles in a reaction vessel.

16. The process of claim 15, further comprising vibrating the carrier to change positions of the particles on the carrier so that the laser light contacts multiple portions of the particles.

17. The process of claim 15, further comprising rastering the one or more lasers across the particles.

18. The process of claim 17, wherein the rastering the one or more lasers across the metal oxide catalyst comprises using one or more mirrors, movement of the one or more lasers, movement of the metal oxide catalyst, or a combination thereof.

19. The process of claim 15, wherein the metal oxide catalyst is formed by oxidation of a metal substrate, powder sintering, vapor deposition, or combinations thereof.

* * * * *